United States Patent Office 3,262,988
Patented July 26, 1966

3,262,988
COMPOSITION COMPRISING LOW DENSITY POLY-
ETHYLENE AND A THERMOPLASTIC POLYHY-
DROXY POLYETHER GIVING SMOOTH CON-
TOUR AT HIGH EXTRUSION SPEEDS
William H. Joyce, Somerset, N.J., assignor to Union
Carbide Corporation, a corporation of New York
No Drawing. Filed Dec. 11, 1962, Ser. No. 243,750
5 Claims. (Cl. 260—836)

This invention relates to compositions useful in wire insulation. More particularly, the invention relates to compositions which are extrudable into wire insulation at very high speeds without sacrifice of surface smoothness.

The search for suitable wire insulating compositions has resulted in the evaluation of numerous synthetic organic polymers. Satisfactory materials for this application must have good dielectric properties and an attractive surface appearance. Ethylene polymers, both low and high density, and polypropylene have low dielectric losses and have been considered to be leading candidates for wire insulation. Polypropylene, however, is deficient in low temperature toughness, with some forms having a brittle temperature of +6° C. Moreover, polypropylene is prone to oxidize and to degrade upon exposure to the atmosphere if in contact with copper. Unfortunately, the additives presently used to control oxidation and degradation of polypropylene, if used in effective amounts increase dielectric losses to unacceptable levels.

Ethylene polymer is an ideal wire insulation. Although high density ethylene polymer is generally too difficultly extrudable to be an optimum wire insulation, low density ethylene polymer extrudes easily and well. The only limitation encountered in the use of low density ethylene polymer is its lack of amenability to very high speed extrusion wire coating. Speeds of 2000 to 3000 feet per minute (f.p.m.) are now not uncommon in wire coating. This speed with low density ethylene polymer has resulted in extruded profiles having impaired surface characteristics. Surface roughness, typified by crested and peaked waviness easily perceived by touch or sight renders wire insulation unattractive and unsalable.

It has been proposed to incorporate polypropylene in ethylene polymer to improve the latter's high speed extrusion performance, but this approach only adds the many, still unsolved, problems of polypropylene insulation to the comparatively few problems of ethylene polymer.

In addition, polypropylene differs widely from ethylene polymer in softening temperature (by ca. 65° C.) and this complicates the achieving of adequate compounding for good pigment dispersion which is so important in colorcoded wires such as telephone singles.

Moreover ethylene polymer and polypropylene blends fail to achieve a homogeneity which enables resistance to microseparations upon tensile stress or bending flexure. This microseparation is evidenced by a whitening of the stressed, flexed insulation.

It is an object, therefore, of the present invention to provide a composition for extruded contours such as wire insulation providing the electrical and physical property benefits of low density ethylene polymer wire insulation, but which is simultaneously extrudable at very high rates into smooth surfaced insulation.

It has now been discovered in accordance with the present invention that this and other objects are achieved by incorporating in low density ethylene polymer extrusion composition, per 100 parts of the low density polymer from 2–25 preferably from 2–17 parts by weight of a thermoplastic polyhydroxyether.

Surprisingly, by the addition of a thermoplastic polyhydroxyether, there is achieved in this invention an improvement in the extrusion characteristics of low density ethylene polymer.

Moreover, despite the lack of a close chemical similarity between thermoplastic polyhydroxyether and low density ethylene polymers compounding a mixture of the two to a homogeneity is not a great problem and good uniformities of electrical and physical properties at high levels are realized particularly with the preferred compositions of this invention.

The term "thermoplastic polyhydroxyether" herein refers to substantially linear polymers having the general

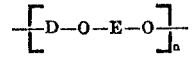

formula
wherein D is the radical residuum of a dihydric phenol, E is an hydroxyl containing radical residuum of an epoxide, and n represents the degree of polymerization and is at least 30 and preferably 80 or more. The term "thermoplastic polyhydroxyether" is intended to include mixtures of at least two thermoplastic polyhydroxyethers.

The dihydric phenol contributing the phenol radical residuum D can be either a dihydric mononuclear phenol such as hydroquinone and resorcinol or a dihydric polynuclear phenol such as those having the general formula

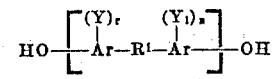

wherein Ar is an aromatic divalent hydrocarbon such as naphthylene and, preferably, phenylene, Y and $Y_1$ which can be the same or different are alkyl radicals, preferably having from 1 to 4 carbon atoms, halogen atoms i.e. fluorine, chlorine, bromine and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or is a divalent radical including, for example,

—O—, —S—, —SO—, —SO—, and —S—S—, and divalent hydrocarbon radicals such as alkylene, alkylidene, cycloaliphatic e.g. cycloalkylene and cycloalkylidene, halogenated, alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include, among others:
The bis-(hydroxyphenyl)-alkanes such as 2,2-bis-(4-hydroxyphenyl)propane,
2,4'-dihydroxydiphenylmethane,
Bis-(2-hydroxyphenyl)methane,
Bis-(4-hydroxyphenyl)methane,
Bis-(4-hydroxy-2,6-dimethyl-3-methoxyphenyl)methane,
1,1-bis-(4-hydroxyphenyl)ethane,
1,2-bis(4-hydroxyphenyl)ethane,
1,1-bis-(4-hydroxy-2-chlorphenyl)ethane,
1,1-bis-(3-methyl-4-hydroxyphenyl)ethane,
1,3-bis(3-methyl-4-hydroxyphenyl)propane, 2,2-bis(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
Bis-(4-hydroxyphenyl)phenylmethane,
Bis-(4-hydroxyphenyl)cyclohexylmethane,
1,2-bis-(4-hydroxyphenyl)-1,2-bis-(phenyl)propane,
2,2-(bis-(4-hydroxyphenyl)-1-phenyl-propane and the like.

Di(hydroxyphenyl)sulfones such as

Bis-(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone, and the like.

Di(hydroxyphenyl)ethers such as

Bis-(4-hydroxyphenyl)-ether, the
4,3'-, 4,2'-, 2,2'-, 2,3'-dihydroxydiphenyl ethers,
4,4'-dihydroxy-2,6-dimethyldiphenyl ether,
Bis-(4-hydroxy-3-isobutylphenyl)ether,
Bis-(4-hydroxy-3-isopropylphenyl)-ether,
Bis-(4-hydroxy-3-chlorophenyl)-ether,
Bis-(4-hydroxy-3-fluorophenyl)-ether,
Bis-(4-hydroxy-3-bromophenyl)-ether,
Bis-(4-hydroxynaphthyl)-ether,
Bis-(4-hydroxy-3-chloronaphthyl)-ether,
Bis-(2-hydroxydiphenyl)-ether,
4,4'-dihydroxy-2,6-dimethoxydiphenyl ether,
4,4'-dihydroxy-2,5-diethoxydiphenyl ether, and the like.

Also suitable are the bisphenol reaction products of 4-vinylcyclohexene and phenols, e.g. 1,3-bis(p-hydroxyphenyl)-1-ethylcyclohexane, and the bisphenol reaction products of dipentene or its isomers and phenols such as 1,2-bis(p - hydroxyphenyl) - 1 - methyl - 4 - isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula

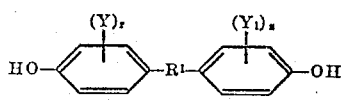

wherein Y and $Y_1$ are as previously defined, $r$ and $z$ have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 9 carbon atoms.

Mixtures of dihydric phenols can also be employed and whenever the term "dihydric phenol" or "dihydric polynuclear phenol" is used herein mixtures of these compounds are intended to be included.

The epoxide contributing the hydroxyl containing radical residuum E can be a monoepoxide or diepoxide. By "epoxide" is meant a compound containing an oxirane group i.e. oxygen bonded to two vicinal aliphatic carbon atoms, thus,

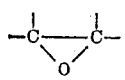

A monoepoxide contains one such oxirane group and provides a radical residuum E containing a single hydroxyl group; a diepoxide contains two such oxirane groups and provides a radical residuum E containing two hydroxyl groups. Saturated epoxides, by which term is meant diepoxides free of ethylenic unsaturation i.e. $>C=C<$ and acetylenic unsaturation, i.e. $-C\equiv C-$, are preferred. Particularly preferred are halogen substituted saturated monoepoxides i.e. the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen, —O—, oxacarbonyl oxygen,

carbonyl oxygen,

and the like.

Specific examples of monoepoxides include epihalohydrins such as epichlorohydrin, epibromohydrin, 1,2-epoxy-1-methyl-3-chloropropane, 1,2-epoxy - 1 - butyl-3-chloropropane, 1,2-epoxy-2-methyl-3-fluoropropane, and the like.

Illustrative diepoxides include

Diethylene glycol,
Bis(3,4-epoxycyclohexane-carboxylate),
Bis(3,4-epoxycyclohexylmethyl)adipate,
Bis(3,4-epoxycyclohexymethyl)phthalate,
6-methyl-3,4-epoxycyclohexylmethyl 6-methyl-3,4-epoxycyclohexane carboxylate,
2-chloro-3,4-epoxycyclohexylmethyl 2-chloro-3,4-epoxycyclohexane carboxylate,
Diglycidyl ether,
Bis(2,3-epoxycyclopentyl)ether,
1,5-pentanediol bis(6-methyl-3,4-epoxycyclohexylmethyl) ether,
Bis(2,3-epoxy-2-ethylhexyl)adipate,
Diglycidyl maleate,
Diglycidyl phthalate,
3-oxatetracyclo[4·4·0·1$^{7,10}$·0$^{2,4}$]undec-8-yl 2,3-epoxypropyl ether,
Bis(2,3 epoxycyclopentyl)sulfone,
Bis(3,4-epoxyhexoxypropyl)sulfone,
2,2'-sulfonyldiethyl bis(2,3-epoxycyclopentanecarboxylate,
3-oxatetracyclo[4·4·0·1$^{7,10}$·0$^{2,4}$]undec-8-yl 2,3-epoxybutyrate,
4-pentenal-di(6-methyl-3,4-epoxycyclohexylmethyl) acetal,
Ethylene glycol bis(9,10-epoxystearate),
Diglycidyl carbonate,
Bis(2,3-epoxybutylphenyl)2-ethylhexyl phosphate,
Diepoxydioxane,
Butadiene dioxide and 2,3-dimethyl butadiene diodide.

The preferred diepoxides are those wherein each of the oxirane groups is connected to an electron donating substituent which is not immediately connected to the carbon atoms of that oxirane group. Such diepoxides have the grouping

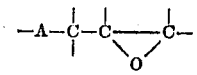

wherein A is an electron donating substituent such as

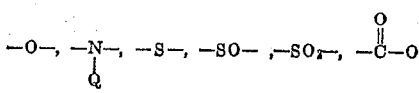

or

and Q is a saturated hydrocarbon radical such as an alkyl, cycloalkyl, aryl or aralkyl radical.

A single monoepoxide or diepoxide or a mixture of at least two monoepoxides or diepoxides can be employed in preparing thermoplastic polyhydroxyethers and the terms "monoepoxide" and "diepoxide" are intended to include a mixture of at least two monoepoxides or diepoxides, respectively.

The low density ethylene polymers which are rendered extrudable at high speeds to smooth surfaced contours by the present invention are homopolymers of ethylene and copolymers of ethylene with minor amounts e.g. up to 10% by weight of one or more other organic compounds copolymerizable therewith which contain polymer producing unsaturation such as is present for example in compounds containing the ethylene linkage >C=C< e.g. styrene, vinyl stearate, vinyl acetate, vinyl formate, monobutyl maleate, acrylic acid, methacrylic acid, methyl methacrylate, ethyl acrylate, 2-ethyl hexyl acrylate, butene, isoprene, butadiene, bicycloheptene, bicycloheptadiene, N-methyl-N-vinyl acetamide, acryamide, vinyl triethoxysilane, divinyl phosphonate and the like. Many other copolymerizable monomers which can be used in addition to these illustrative compounds are well known to the art. Low density ethylene polymers in the instant compositions range in density from 0.915 to 0.925 and preferably from 0.918 to 0.922. Ethylene homopolymer is the preferred ethylene polymer.

Thermoplastic polyhydroxyether can be incorporated in the low density ethylene polymer by any of the techniques known and used in the art to blend and compound thermoplastics to homogeneous masses. Among other techniques are fluxing in a variety of apparatus including multi-roll mills, screw mills, compounding extruders and Banbury mixers, dissolving in mutual or compatible solvents and like or equivalent methods.

The compositions of the present invention can contain in the usual amounts, conventional additives, e.g. fillers, extenders, opacifiers, modifiers and stabilizers.

The invention is illustrated by the following examples wherein all parts and percentages are by weight. Melt flow of the thermoplastic polyhydroxyethers was determined by weighing in grams of the amount of polyhydroxyether which, at a temperature of 220° C. and under a pressure of 44 p.s.i., flowed through an orifice having a diameter of 0.825″ and a length of 0.315″ over a ten minute period. Four such determinations were made and the average of the four determinations is reported as decigrams per minute under a pressure of 44 p.s.i. and at 220° C.

All compositions were prepared by fluxing the components in a Banbury mixer at a temperature of about 155° C. The material was then sheeted and granulated for extrusion. The extrusion onto wire was carried out using a No. 1 Royle 2″ barrel extruder fitted with a Hartig wire crosshead and a die having an included angle of 45°, a parallel land of 0.036 inch and a die opening of 0.036 inch. No. 24 AWG copper wire (0.020 inch diameter) was extrusion coated at a rate of 2400 f.p.m.

*Example 1*

The thermoplastic polyhydroxyether used was prepared by the reaction of equimolar amounts of 2,2-bis(4-hydroxyphenyl)propane and epichlorohydrin together with sodium hydroxide. The reactor equipment used was provided with a sealed stirrer, thermometer, and reflux condenser. There was placed in the reactor:

| | Parts |
|---|---|
| 2,2-bis(4-hydroxyphenyl)propane | 114.5 |
| Epichlorohydrin (99.1% pure) | 46.8 |
| Ethanol | 96.0 |
| Butanol | 10.0 |
| Sodium hydroxide (97.5% pure) | 22.6 |
| Water | 70.0 |

The above mixture was stirred at room temperature for 16 hours to accomplish the initial coupling reaction. The mixture was then heated at 80° C. for an hour. Sixty parts of a 7:3 mixture of toluene:butanol was added. Heating of the mixture at 80° C. was continued another two hours. There was added to the reactor an additional 50 parts of the 7:3 toluene:butanol mixture and 4.5 parts of phenol. The contents of the reactor were continued heated at 80° C. (reflux) for 2½ hours. Upon cooling, the reaction mixture was cut with 200 parts of the 7:3 toluene:butanol mixture. One hundred parts of water was added to the reactor and agitated with the contents to dissolve salts present in the reaction mixture. A lower brine phase was separated by decantation. The upper polymer solution containing phase was washed successfully with two 160 part portions of water containing 4.5% butanol. The washed polymer solution was acidified by stirring the solution with a mixture of 1 part of 85% phosphoric acid with 100 parts of water (pH=2) for one hour. The upper polymer solution phase was again separated by decantation and water washed with four successive 200 part portions of water containing 4.5% butanol. The washed polymer was then coagulated in 1000 parts of isopropanol, filtered, and dried. There was obtained a thermoplastic polyhydroxyether of 2,2-bis(4-hydroxyphenyl)propane and epichlorohydrin having a melt flow of 7.0 decigrams per minute.

The composition comprised 94.9 parts of a 0.920 density ethylene homopolymer having a melt flow at 440 p.s.i. and 190° C. of 30, 5.0 parts of the above prepared thermoplastic polyhydroxyether and 0.1 part of a stabilizer.

Wire coated with this composition had a perfectly smooth surface both to the eye and to the touch.

Pigmenting this composition does not affect surface smoothness.

*Example 2*

Example 1 was duplicated but employing as the thermoplastic polyhydroxyether one having a melt flow of 0.5. Results were identical.

*Example 3*

Example 1 was duplicated but employing 10 parts of the thermoplastic polyhydroxyether and 89.9 parts of the low density ethylene polymer. Results were identical.

*Example 4*

Example 1 is duplicated but employing 20 parts of the thermoplastic polyhydroxyether and 79.9 parts of the low density ethylene polymer. Although extrusion requires more power than the preceding compositions contour smoothness results are identical.

The compositions described herein are useful for all extrusion applications especially where high speed extrudability is needed. Typical applications include wire insulation, both solid and cellular, cable jacketing and pipe.

What is claimed is:

1. Composition useful as high extrusion speed wire insulation comprising an ethylene polymer having a density of from 0.915 to 0.925 and per 100 parts by weight thereof from 2 to 25 parts by weight of a thermoplastic polyhydroxyether, said polyhydroxyether having been prepared by the reaction of equimolar amounts of a dihydric phenol and an epoxide selected from the group consisting of diepoxides and halogen containing monoepoxides.

2. Composition claimed in claim 1 wherein there is present from 2 to 17 parts by weight of the thermoplastic polyhydroxyether.

3. Composition claimed in claim 2 wherein the ethylene polymer has a density of from 0.918 to 0.922.

4. Composition claimed in claim 3 wherein the melt flow of the thermoplastic polyhydroxyether is from 0.5 to 7.

5. An insulated wire coated with the composition claimed in claim 2.

References Cited by the Examiner

UNITED STATES PATENTS 2,912,398 11/1959 Johnson et al. ------ 260—837
3,139,414 6/1964 Ranalli ------------ 260—837

FOREIGN PATENTS 1,187,838 5/1959 France.

SAMUEL H. BLECH, *Primary Examiner.*
MURRAY TILLMAN, *Examiner.*
E. B. WOODRUFF, *Assistant Examiner.*